United States Patent [19]

Nijman

[11] Patent Number: 4,510,005

[45] Date of Patent: Apr. 9, 1985

[54] METHOD AND APPARATUS FOR RESHAPING AND POLISHING AN END FACE OF AN OPTICAL FIBER

[75] Inventor: John P. Nijman, Wheaton, Ill.

[73] Assignee: Allied Corporation, Morristown, N.J.

[21] Appl. No.: 426,026

[22] Filed: Sep. 28, 1982

[51] Int. Cl.³ .............................................. G02B 5/14
[52] U.S. Cl. .......................................... 156/221; 65/2;
65/11.1; 65/12; 65/102; 65/104; 65/292;
264/1.4; 264/1.5; 264/2.7; 264/25; 156/272.8;
156/294; 156/295; 156/379.6; 156/379.8;
156/423; 156/499; 156/500; 156/579; 219/121
LF; 219/121 LM; 425/174; 425/392
[58] Field of Search ............................ 264/1.4, 1.5, 2.7;
350/96.20, 96.18; 65/2, 11.2, 12, 102, 104, 292;
156/221, 272.8, 294, 295, 379.6, 379.8, 423, 499,
500, 579; 219/121 LF, 121 LM, 121 LP;
425/174, 392

[56] References Cited

U.S. PATENT DOCUMENTS

| 3,128,167 | 4/1964 | Woodcock | 264/1.5 |
|---|---|---|---|
| 3,448,180 | 6/1969 | Opferkuch, Jr. | 265/1.5 |
| 3,454,898 | 7/1969 | Comstock | 331/94.5 |
| 3,478,278 | 11/1969 | Muncheryan | 331/94.5 |
| 4,135,781 | 1/1979 | Archer | |
| 4,147,402 | 3/1979 | Chown | 264/1.4 |
| 4,191,447 | 3/1980 | Borsuk | 350/96.20 |
| 4,198,119 | 4/1980 | Uberbacher | 350/96.2 |
| 4,276,520 | 6/1981 | Rosenberg | 331/94.5 |
| 4,349,497 | 9/1982 | Blackington | 264/1.5 |
| 4,353,849 | 10/1982 | Lewison | 264/2.7 |
| 4,379,771 | 4/1983 | Snyder | 264/1.5 |

FOREIGN PATENT DOCUMENTS

| 58461 | 8/1982 | European Pat. Off. | |
| 2557472 | 6/1977 | Fed. Rep. of Germany | |
| 2835582 | 2/1980 | Fed. Rep. of Germany | |
| 52-9444 | 1/1977 | Japan | 350/96.20 |
| 56-5508 | 1/1981 | Japan | 350/96.20 |

OTHER PUBLICATIONS

Paul F. Jacobs, "Miles: Tactical Training with Lasers", Laser Focus, pp. 65–74, Sep. 1982.
Patent Abstracts of Japan, vol. 6, No. 2, Jan. 8, 1982.

*Primary Examiner*—James B. Lowe
*Attorney, Agent, or Firm*—James Riesenfeld; Gerhard Fuchs; Roger H. Criss

[57] ABSTRACT

The end face of an optical fiber is urged against the highly polished surface of a disk as a laser beam is directed toward the disk to heat the end face above its softening temperature and cause it to conform to the contour and finish of the highly polished surface. A termination ferrule may be simultaneously mounted on the fiber optic cable with a heat bonding agent, using as a heat source either the laser beam or an auxiliary heat source. A hand-held, gun-type unit with a built-in disk and triggered laser can be used to polish and terminate optical fibers in the field.

17 Claims, 5 Drawing Figures

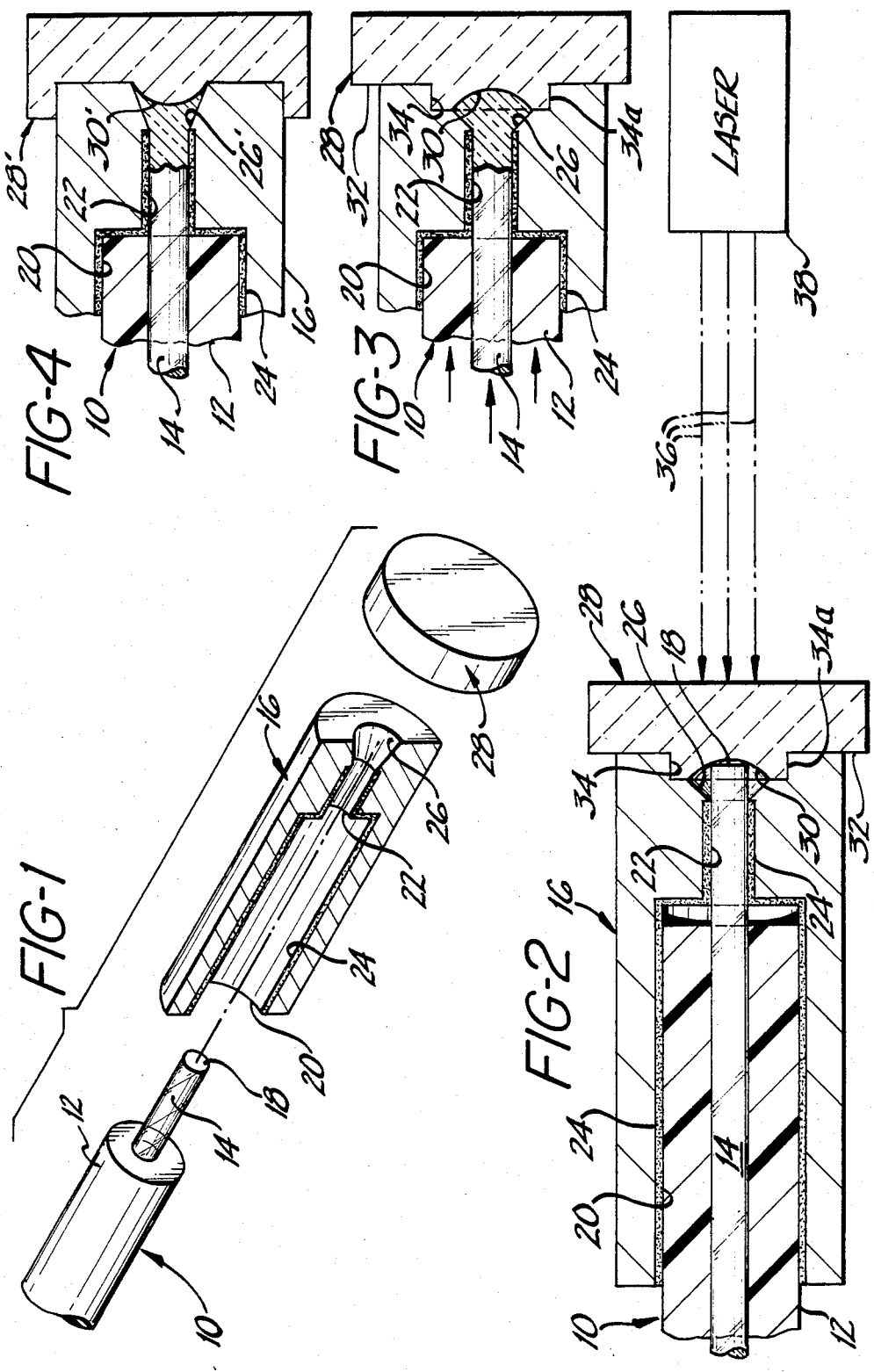

METHOD AND APPARATUS FOR RESHAPING AND POLISHING AN END FACE OF AN OPTICAL FIBER

BACKGROUND OF THE INVENTION

1. Field of the Invention

This invention relates to a method and apparatus for finishing the end faces of optical fibers, and in particular to a method and apparatus for both preparing the end face of an optical fiber and terminating the fiber and its outer jacket with a suitable termination ferrule or the like.

2. Description of the Prior Art

Optical fibers, i.e., thin fibers of optical plastic, glass, or silica, having diameters ranging from about 5 to 250 micrometers, are well known in optical communication systems. In such systems, low light-loss connections are desirable to join two light transmitting cables of optical fibers or to terminate a light transmitting cable on a chassis or terminal board. To optimize light coupling efficiency, the end face, or end surface, of each film must be smooth, with a surface configuration (flat, convex, or concave) that is symmetrical about the fiber's axis.

Typically, the fiber end face is prepared by grinding and polishing or by scribing and breaking. The scribe and break technique, properly executed, yields flat and smooth end surfaces, but does not reliably yield surfaces that are exactly perpendicular to the fiber's axis. Grinding and polishing, on the other hand, can yield flat, perpendicular surfaces (U.S. Pat. No. 4,135,781) but does not readily lend itself to the production of convex or concave surfaces. The desired smoothness is achieved by using extremely small-size polishing grit. However, grinding and polishing are slow and costly. The degree of polish and, consequently, the amount of light-loss vary considerably, depending on operator skill and equipment.

Another method that has been used to prepare the face of an optical fiber involves using an electric arc discharge to melt the tip of the fiber and form a "bead." This method has the drawback that the size and position of the bead depend on parameters that are difficult to control, such as arc temperature, ambient relative humidity, and the shape of the initial break.

U.S. Pat. No. 4,147,402, issued Apr. 3, 1979, to M. Chown, discloses a process for manufacturing a lens termination for an optical fiber using laser machining to form a cavity which centers the fiber in the termination. However, in that process, the laser acts only on a plastic preform and does not affect the fiber end face.

SUMMARY OF THE INVENTION

In accordance with the present invention, there is provided an apparatus for polishing the end face of an optical fiber comprising:

a mold having a polished surface on at least one side;

means for holding the optical fiber and mold so that the end face and polished surface are urged into contact; and means for heating the end face to a temperature above the softening temperature of the fiber to cause the end face to conform to the polished surface.

An apparatus for terminating a fiber optic cable includes, in combination with the above elements, means for holding the end of the cable in close proximity with an inner surface of a tubular member and means for heating a heat bonding agent that is between the inner surface and the cable to bond the tubular member to the cable.

In operation, polishing the end face of an optical fiber comprises the steps of:

providing a mold having a polished surface adapted for contacting the optical fiber end face;

urging the end face and polished surface into contact; and heating the end face to a temperature above the softening temperature of the fiber to cause the end face to conform to the polished surface.

Terminating a fiber optic cable containing an optical fiber with an end face at one end of the cable, comprises the steps of:

providing a tubular member having an inner surface that is in close proximity to and surrounds the fiber optic cable and a heat bonding agent that is between the inner surface and the cable;

providing a mold having a polished surface adapted for contacting the end face;

urging the end face and polished surface into contact;

heating the end face to a temperature above the softening temperature of the fiber to cause the end face to conform to the polished surface; and heating the heat bonding agent to bond the tubular member to the cable.

BRIEF DESCRIPTION OF THE DRAWINGS

Like reference numerals identify like elements in the figures.

FIG. 1 is a perspective view of a fiber optic cable with a slightly protruding optical fiber, a ferrule for terminating the cable, and a mold.

FIG. 2 is a partly sectional view illustrating a laser irradiating an opaque disk placed adjacent to a ferrule and fiber.

FIG. 3 is a sectional view showing the fiber of FIG. 2 after irradiation.

FIG. 4 is a sectional view showing a transparent disk having a convex polished surface.

DETAILED DESCRIPTION OF THE INVENTION

Figure 5:
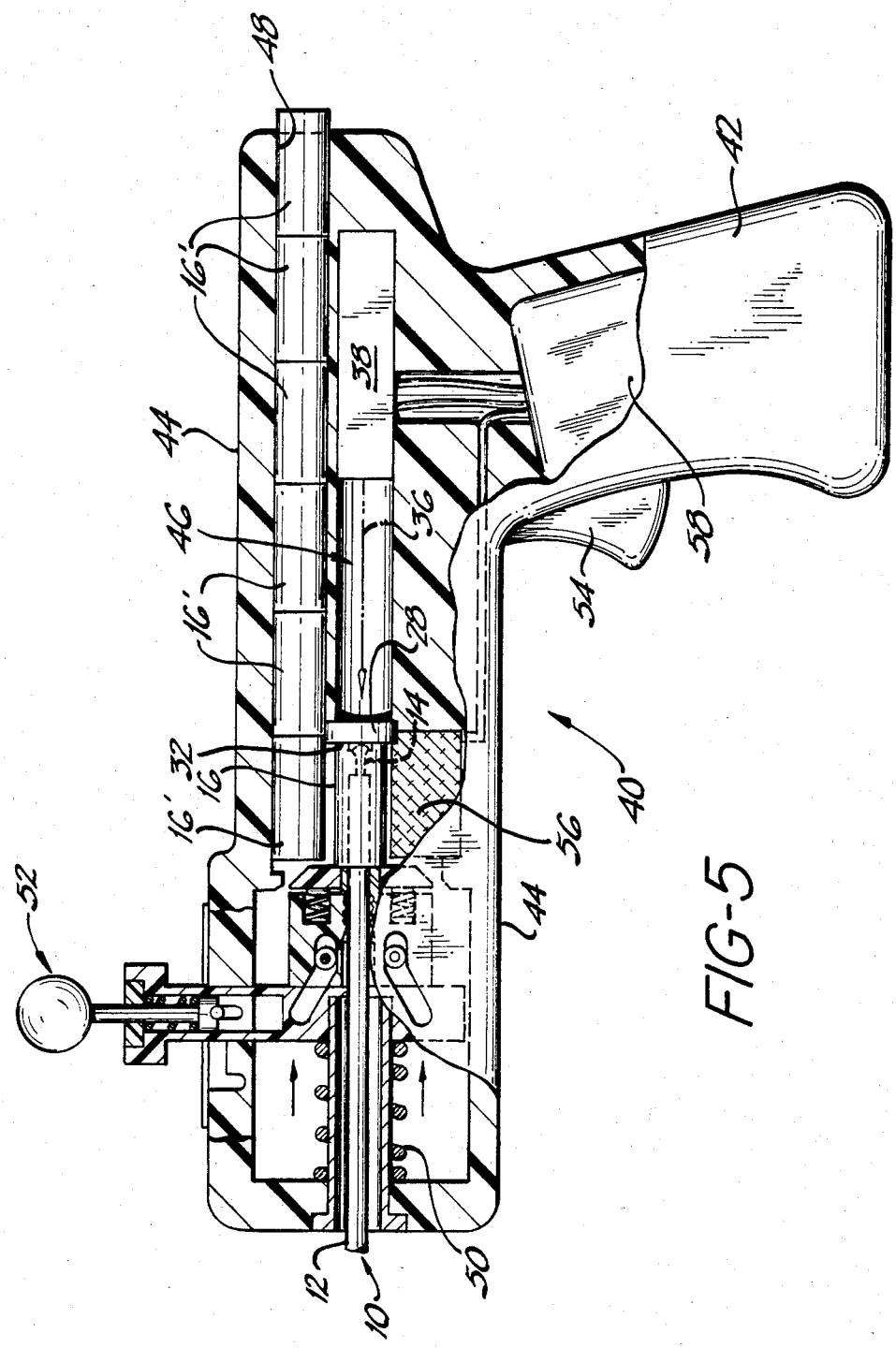
FIG. 5 is an elevational view, partly fragmented, illustrating a hand-held embodiment of the invention.

This invention provides apparatus and methods for polishing the end face of an optical fiber and for terminating a fiber optic cable. The invention involves heating the end face of an optical fiber above its softening temperature while urging it against a polished surface of a mold, or disk. As a result, the end face acquires a polished surface, while its shape is formed by the mold. The heating is preferably accomplished by laser irradiation. Optionally, a fiber optic cable is terminated in a tubular member, or ferrule, at the same time as the end face is polished. The termination involves heat bonding the cable inside the ferrule, using as a heat source either the laser or an auxiliary heat source. In a preferred embodiment, the apparatus of the invention is enclosed in a gun-shaped housing, the fiber optic cable to be terminated is inserted into the barrel, and a laser beam is directed along the inside of the barrel.

In the method of the present invention, the end face of an optical fiber is urged against a mold that has a polished surface, and the end face is then heated to a temperature above its softening temperature. The optical fiber is preferably glass, but may also be plastic, quartz or other highly transparent fiber material.

A preferred means for heating the end face is by directing radiation from a laser onto the mold. A laser is selected whose output radiation is either absorbed by the mold or else substantially transmitted by the mold and absorbed by the fiber. If the radiation is absorbed by the mold, the mold heats up and the heat is transmitted to the optical fiber by conduction. Preferably, the mold is substantially transparent to the laser radiation, in which case the optical fiber is heated directly by absorbing the radiation. The laser power required depends on the wavelength of the radiation, the absorption characteristics of the mold and optical fiber, and the softening temperature of the fiber. A pulsed $CO_2$ laser emitting at least 1 W is suitable for use with a substantially transparent mold and glass fiber. Preferably, the power, pulse duration, and focused spot size of the laser may be controlled to provide heating that is optimum for a particular fiber material and diameter. Similarly, optimum wavelength for different fiber materials may be provided by using either a tunable laser or by replacing one laser with another.

The polished surface of the mold, against which the fiber is urged, may be flat or shaped. A rounded, e.g., spherically convex or concave, mold surface is often preferred, because the fiber end face formed by such a surface reduces reflection losses. Such an end face, if convex, acts as a lens to concentrate an optical signal. Alternatively, a concave end face spreads an optical signal. Both convex and concave end faces, when matched with identical end faces of another fiber, avoid fiber-to-fiber contact over a large area, which can lead to undesirable rubbing and loss of transparency.

The mold may be of any material capable of withstanding temperatures at least in the range of the fiber softening temperature and also capable of being polished. Ceramics, well known in the art, are suitable for the embodiment in which the mold absorbs the laser radiation. Germanium is a preferred mold material because it is substantially transparent to 10.6 $\mu$m infrared laser radiation from a $CO_2$ laser, which radiation is strongly absorbed in glass fibers. Other infrared-transmitting materials are also suitable.

A fiber optic cable is terminated by the method of the present invention by surrounding an end of the cable with a ferrule, which is heat bonded to the cable and fiber. The ferrule material must withstand the high temperature at which the optical fiber end face is softened and must bond well to the cable and fiber. Metals, ceramics, and glasses are among the materials that are suitable for the ferrule. A variety of heat bonding materials well known in the art, such as epoxies, are suitable for joining the cable to the ferrule.

In accordance with one embodiment of the invention, there is provided apparatus useful for terminating optical fibers either in a factory environment or in the field. In particular, a portable, handheld body in the form of a gun includes a hollow barrel portion holding a mold, such as a disk having a polished surface. A fiber optic cable may be inserted into the barrel and the optical fiber end face urged against the polished surface of the mold. Means are provided for enabling a laser to emit radiation and heat the mold, thereby causing the optical fiber end face to soften and conform to the polished surface of the mold. If the mold is transparent to the laser radiation, the fiber may be heated directly. Laser "guns" of the type suitable for use in a portable device have been disclosed in U.S. Pat. Nos. 3,454,898; 3,478,278; and 4,276,520. Although these disclosures involve solid state lasers, other lasers, such as a sealed tube waveguide $CO_2$ laser, are also suitable.

In a preferred embodiment, a ferrule is adapted to fit onto the outer surface of the fiber optic cable with a heat bonding agent between the ferrule and the cable. Inside the hollow barrel portion, the optical fiber end face is uged against the polished surface of the mold. Application of radiation from a pulsed laser onto the mold simultaneously polishes the optical fiber end face and heat bonds the ferrule to the fiber optic cable. Alternatively, electrical heating means, such as an induction coil or a resistance heater, may be mounted in the hand-held body immediately adjacent to the ferrule to supply heat to the bonding agent to insure reliable bonding between the ferrule and the fiber optic cable.

FIG. 1 illustrates one end of a fiber optic cable 10, including an outer jacket 12 with a central optical fiber 14 to be terminated by a ferrule 16 in accordance with the present invention. Initially, the optical fiber includes an unpolished end face 18, which must be highly polished in order to permit efficient transmission of light. The ferrule is formed with a hollow, cylindrical bore 20 and a smaller diameter hollow, cylindrical bore 22, suitably sized so as to permit the ferrule to be fitted onto the cable as shown in FIG. 2. Either or both of the hollow portions 20 and 22 may be tapered to facilitate holding the cable and fiber. One or both of the inner surfaces of the hollow portions of the ferrule may be coated with a heat bonding agent 24. Alternatively, a suitable heat bonding agent may be applied to the outer jacket of the cable and/or the protruding outer surface of the optical fiber. In any event, the heat bonding agent is placed between the ferrule and the fiber optic cable so that the ferrule can be heat bonded to the cable. For proper alignment, the cable and fiber should fit snugly into the ferrule. Preferably, the ferrule is flared at the end of its narrow bore to provide a cavity 26 into which the fiber, when softened, can flow as it is urged against mold 28 during polishing and forming of the end face. In the embodiment of the present invention in which only polishing is accomplished, ferrule 16 is replaced by an alignment device having the above-described geometric features of the ferrule. The alignment device uses no bonding agent 24 and is removed after the fiber is polished.

FIG. 2 illustrates an apparatus for terminating the fiber optic cable while at the same time polishing and forming the optical fiber end face 18. A mold 28, preferably in the form of a disk of a suitable (in this case, opaque) material, includes a side with a highly polished surface 30. The narrow-bore end of ferrule 16 abuts flat section 32 of mold 28. Optionally, to facilitate alignment, recess 34 on the ferrule receives protrusion 34a on the mold. The cable 12 and fiber 14 are then positioned so that optical fiber end face 18 is urged against highly polished surface 30.

A laser beam 36 emitted from a laser 38, such as a pulsed infrared laser, is directed onto opaque mold 28, which absorbs the radiation 36 and heats up. The heat is transferred to optical fiber end face 18, causing the fiber to soften and conform to cavity 26 and polished surface 30. As the softened fiber conforms to cavity 26, cable 12 and fiber 14 may slide within cores 20 and 22, respectively, to maintain intimate contact between end face 18 and polished surface 30, yielding the arrangement shown in FIG. 3. At the same time, heat is transferred to heat bonding agent 24, thereby bonding the cable to the ferrule. Alternatively, another heat source, such as an induction coil or resistance heater (56 in FIG. 5), may be provided to insure heating of bonding agent 24 and reliable bonding of the ferrule to the cable.

FIG. 4 shows an embodiment of the present invention in which mold 28 is substantially transparent to the laser radiation. For example, if a $CO_2$ laser is used, mold 28 may be of germanium or other material that is substantially transparent to the 10.6 $\mu$m infrared radiation from that laser. Optical fiber 14 absorbs the radiation, heats up to a temperature above its softening temperature, and is thus made to conform to polished surface 30' of mold 28'. Depending on the shape of the polished surface, the end face can be convex, as shown in FIG. 3, concave, as shown in FIG. 4, or other shape, as desired. The simplest form of mold is a circular disk with flat, parallel faces.

FIG. 5 illustrates a hand-held tool 40 as a preferred embodiment of the invention for use in terminating a fiber optic cable. Tool 40 is generally gun-shaped and includes a handle 42 and a hollow barrel portion 44 with an elongated cylindrical compartment 46. Mold 28 is suitably mounted in the hollow barrel portion with highly polished surface 30 facing an open, free end of passageway 46 and opposite side facing laser 38 mounted within the barrel portion. Ferrule 16, having a suitable bonding agent on its inner surfaces, butts against flat section 32 of the mold in passageway 46 and then receives fiber optic cable 10 in the same manner as is shown in the detail of FIG. 2. A coil spring 50 insures intimate contact between the optical fiber end face and surface 30 during the forming and polishing operations. Spring-loaded hold-and-release mechanism 52 permits cables to be introduced into the barrel and, after termination, to be removed.

A trigger switch 54 operatively connected to a laser power supply may be operated to actuate laser 38 to emit light beam 36 toward mold 28. The action of beam 36 in polishing the optical fiber end face and in simultaneously heating bonding agent 24 is identical to that previously described in connection with FIG. 2. Alternatively, an electrical coil 56 is suitably mounted in barrel portion 44 and actuable through operation of trigger 54 and power supply 58 to provide an additional heat source to insure sufficient heating of bonding agent 24.

As indicated in FIG. 5, barrel portion 44 includes another cylindrical passageway 48 for receiving additional ferrules 16'. Thus, upon removal of fiber optic cable 10 with a bonded termination ferrule 16 from the hand-held unit, another ferrule moves from passageway 48 into position adjacent mold 28 to receive another cable for termination. The ferrule may be fed from passageway 48 by gravity, by a conventional spring-actuated ammunition feeding means, common in automatic weapons, or by other well-known methods.

In a preferred embodiment of the present invention, a number of manually adjustable controls are provided for establishing various operating parameters of the laser to optimize the operation of the tool with different combinations of optical fiber, ferrule, bonding, and mold materials. These controls, which may be located on the underside of the barrel 44 of tool 40 or any other convenient location, typically establish such beam parameters as intensity, focal point, pulse duration, pulse rate, wavelength, etc. In a practical cable termination application, the proper setting of these controls will be guided by:

i. Optical fiber diameter;
ii. Softening temperature of fiber material;
iii. Opacity of fiber material to laser radiation of a given wavelength;
iv. Opacity of mold material to laser radiation of a given wavelength;
v. Mass of the mold;
vi. Heat conductivity of mold material;
vii. Opacity of ferrule material to laser radiation of a given wavelength;
viii. Mass of ferrule;
ix. Heat conductivity of ferrule material;
x. Opacity of bonding material to laser radiation of a given wavelength;
xi. Minimum bonding temperature of bonding material; and,
xii. Maximum temperature which bonding material can safely withstand.

Routine experimentation with a particular fiber type and size in combination with a particular mold will yield control settings that are optimum for use with a particular ferrule and heat bonding material.

While particular embodiments of the present invention have been shown and described, it will be obvious to those skilled in the art that various changes and modifications may be made without departing from the invention in its broader aspects. Accordingly, the aim of the appended claims is to cover all such changes and modifications as may fall within the true spirit and scope of the invention.

What is claimed is:

1. A method of polishing the end face of an optical fiber comprising the steps of:
   providing a mold having a rounded polished surface adapted for contacting the optical fiber end face;
   urging the end face and polished surface into contact; and
   directing radiation from a laser onto the mold in order to heat the end face to a temperature above the softening temperature of the fiber and, thereby, to cause the end face to conform to the polished surface.

2. A method of terminating a fiber optic cable containing an optical fiber with an end face at one end of the cable, comprising the steps of:
   providing a tubular member having an inner surface that is in close proximity to and surrounds the fiber optic cable and a heat bonding agent that is between the inner surface and the cable;
   providing a mold having a rounded polished surface adapted for contacting the end face;
   urging the end face and polished surface into contact;
   directing radiation from a laser onto the mold in order to heat the end face to a temperature above the softening temperature of the fiber and, thereby, to cause the end face to conform to the polished surface; and
   heating the heat bonding agent to bond the tubular member to the cable.

3. The method of claim 2 in which the heat bonding agent is provided as a coating on the inner surface of the tubular member.

4. The method of claim 2 in which the polished surface comprises a spherical cavity in the mold.

5. The method of claim 2 in which the polished surface comprises a raised spherical area on the mold.

6. The method of claim 2 in which the mold is substantially transparent to the laser radiation.

7. An apparatus for polishing the end face of an optical fiber comprising:
- a mold having a rounded polished surface on at least one side;
- means for holding the optical fiber and mold so that the end face and polished surface are urged into contact; and
- laser means for heating the end face to a temperature above the softening temperature of the fiber to cause the end face to conform to the polished surface.

8. An apparatus for terminating a fiber optic cable containing an optical fiber with an end face at one end of the cable, comprising the apparatus of claim 7 in combination with
- means for holding the end of the cable in close proximity with an inner surface of a tubular member and
- means for heating a heat bonding agent that is between the inner surface and the cable to bond the tubular member to the cable.

9. The apparatus of claim 7 or 8 in which the polished surface comprises a spherical cavity in the mold.

10. The apparatus of claim 7 or 8 in which the polished surface comprises a raised spherical area on the mold.

11. The apparatus of claim 9 or 10 in which the mold is substantially transparent to a beam emitted by the laser.

12. The apparatus of claim 8 in which the means for heating both the end face and heat bonding agent comprises a laser.

13. The apparatus of claim 8 in which the means for heating the heat bonding agent comprises an induction heater.

14. The apparatus of claim 8 further comprising a housing for the apparatus, including
- a first hollow interior section adapted for holding the mold, the end of the cable, and the tubular member; and
- a second section adapted for holding a laser oriented so that a beam emitted by the laser is directed toward the mold.

15. The apparatus of claim 14 in which the mold is substantially transparent to the laser beam.

16. The apparatus of claim 14 in which the housing is portable and is in the form of a gun, with the first hollow interior section comprising a barrel of the gun.

17. The apparatus of claim 14, further comprising means in the first hollow interior section adapted for holding a plurality of tubular members and means for repeatedly moving a tubular member into position for insertion of the end of the cable into the tubular member.

* * * * *